United States Patent [19]

Schett et al.

[11] Patent Number: 4,457,386
[45] Date of Patent: Jul. 3, 1984

[54] TEMPERATURE-CORRECTED WEIGHING APPARATUS HAVING ELECTROMAGNETIC LOAD COMPENSATION MEANS

[75] Inventors: Oskar Schett; Richard Leemann, both of Uster, Switzerland.

[73] Assignee: Mettler Instruments AG, Greifensee, Switzerland

[21] Appl. No.: 421,779

[22] Filed: Sep. 23, 1982

[30] Foreign Application Priority Data

Feb. 10, 1982 [CH] Switzerland .............................. 808/82

[51] Int. Cl.³ ........................... G01G 7/00; G01G 3/14
[52] U.S. Cl. ............................... 177/212; 177/210 EM
[58] Field of Search ........................ 177/210 EM, 212

[56] References Cited

U.S. PATENT DOCUMENTS

| | | | |
|---|---|---|---|
| 3,084,753 | 4/1963 | Hendon | 177/212 X |
| 3,688,854 | 9/1972 | Strobel | 177/212 X |
| 4,034,819 | 7/1977 | Akers et al. | 177/212 X |
| 4,091,886 | 5/1978 | Knothe et al. | 177/212 X |
| 4,159,747 | 7/1979 | Realini | 177/212 X |
| 4,236,590 | 12/1980 | Knothe et al. | 177/212 X |
| 4,300,647 | 11/1981 | Knothe et al. | 177/212 |

*Primary Examiner*—George H. Miller, Jr.
*Attorney, Agent, or Firm*—Laubscher, Philpitt & Laubscher

[57] ABSTRACT

A weighing system of the electromagnetic load compensation type is disclosed including a counter for counting the weight-responsive pulses which are produced during the periods that the compensating current is supplied to the movable coil to return the movable scale member toward its initial no-load position, characterized by the provision of a temperature-responsive device for supplying to the counter a train of temperature-correction pulses that are used to modify the count of the weight-responsive pulses, whereby a more accurate indication of the applied load is obtained. Thus, an analog signal from the temperature sensor is compared with a sawtooth signal to produce a digitalized temperature-responsive signal which modifies the digital weight signal supplied to the microprocessor circuit.

5 Claims, 2 Drawing Figures

TEMPERATURE-CORRECTED WEIGHING APPARATUS HAVING ELECTROMAGNETIC LOAD COMPENSATION MEANS

BRIEF DESCRIPTION OF THE PRIOR ART

Weighing systems of the return-to-zero electromagnetic load compensation type are well known in the patented prior art, as evidenced, for example, by the U.S. patents to Allenspach No. 3,786,884 and Baumann et al U.S. Pat. No. 3,816,156.

In these known systems, a displacement signal responsive to the displacement of the movable load-receiving scale member from its initial no-load position is compared with a sawtooth voltage to produce a control signal for supplying compensation current to the load compensation for controlled periods of time corresponding with the magnitude of the load. Means are provided for counting the counting pulses produced by a source thereof during periods corresponding with the periods during which compensation current is supplied to the coil, thereby to provide an indication of the magnitude of the applied load.

A known problem in the operation of such scales involves the temperature influences which result, for example, not only owing to the heating of the compensation system under load, but also from changing ambient temperatures. In this connection it is already known that one can provide a heat sensor which corrects the constant current source (as shown by the U.S. Pat. to Kunz No. 3,786,678). Other scales hve a resistance grid which corrects the undesirable temperature influences (as evidenced by the German Offenlegungsschrift No. 2,400,881). Moreover, in the digitally indicating string scale shown by the German Auslegeschrift No. 2,519,727, a digital correction of the measurement value by means of firmly stored factors is accomplished which if necessary can also be altered in accordance with current operating conditions (for example, as derived from the signals of a temperature sensor).

For the analog-to-digital conversion of two magnitudes with different accuracy requirements (such as, for example, weight, on the one hand, and temperature, on the other hand) one could in a conventional manner use two separate analog-to-digital converters. The extra effort connected with this, however, is undesirable. The present invention at hand, therefore, arose from the task of facilitating automatic digital temperature compensation in a scale of the kind mentioned initially in a simple manner and without the use of any additional analog-to-digital converter.

SUMMARY OF THE INVENTION

According to a primary object of the present invention, it is proposed for the solution of this task that a temperature sensor be placed in the scale in the known manner, that a comparator be provided for the comparison of the possibly amplified analog temperature signal with a periodic sawtooth voltage, that a counting circuit be provided to count timing impulses up to the response of the comparator, that a store unit be included to receive the digital temperature value resulting from the counting operation, and that the computer circuit be arranged for the calculation of the digital temperature value with the digital weight result. It would be obvious to use a conventional multiplexer to allow for the temperature signal. That would be tantamount to roughly the same consideration of the weight and temperature signals which, however, is not required. In a preferred version, the arrangement therefore is so made that a control circuit is provided for the counting circuit which is so designed that the temperature signal is counted out once for a weight determination comprising a plurality of compensation current turn-on times. This means that the current process of weight determination is practically not influenced. The only one-time consideration of the temperature signal is here all the more adequate since this involves only an error correction for which a considerably smaller resolution suffices in case of a given resolution of weight.

While it would be possible to use the same comparator for the weight and temperature recording, this would signify a considerable additional effort in terms of the circuitry required. Preference was therefore given to a version where a separate comparator is provided for weight recording and for temperature recording. This can be done all the more simply since integrated circuits with two comparators in each case are commercially available.

Fundamentally, it would be enough to consider the temperature in a digital manner according to the invention. On the other hand, the working materials usually employed for the compensation system (for example, the magnet material) typically contain a temperature coefficient which is more or less heavily scattered around mean value. For this reason it is preferred to connect the temperature sensor both to the comparator and to the current source. From this combination of conventional and invention measures, the advantage is obtained that the total compensation of the temperature influence—with the same effort regarding the accuracy of temperature recording—can be achieved considerably more accurately than in case of purely digital compensation because only the individual scatter of the temperature coefficient must be considered in a digital fashion.

If the control device for the counting processes is properly designed, one can provide the same counting circuit for counting the timing impulses both of the weight signal and of the temperature signal.

BRIEF DESCRIPTION OF THE DRAWING

Other objects and advantages of the invention will become apparent from the following specification, when viewed in the light of the accompanying drawing, in which.

DETAILED DESCRIPTION

Figure 1:
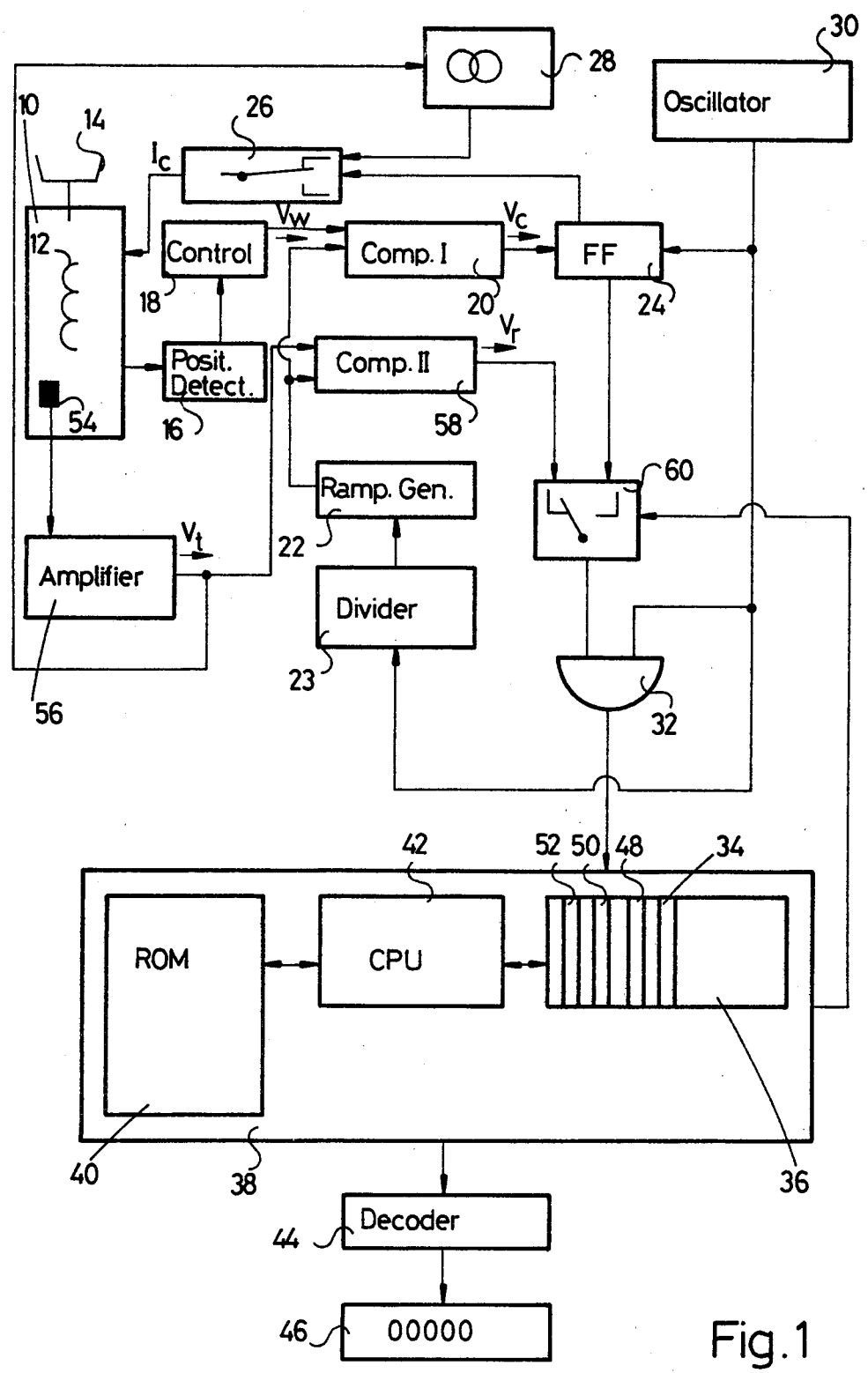
FIG. 1 is an electrical block diagram of the temperature-corrected electromagnetic load compensation weighing system.
Figure 2:
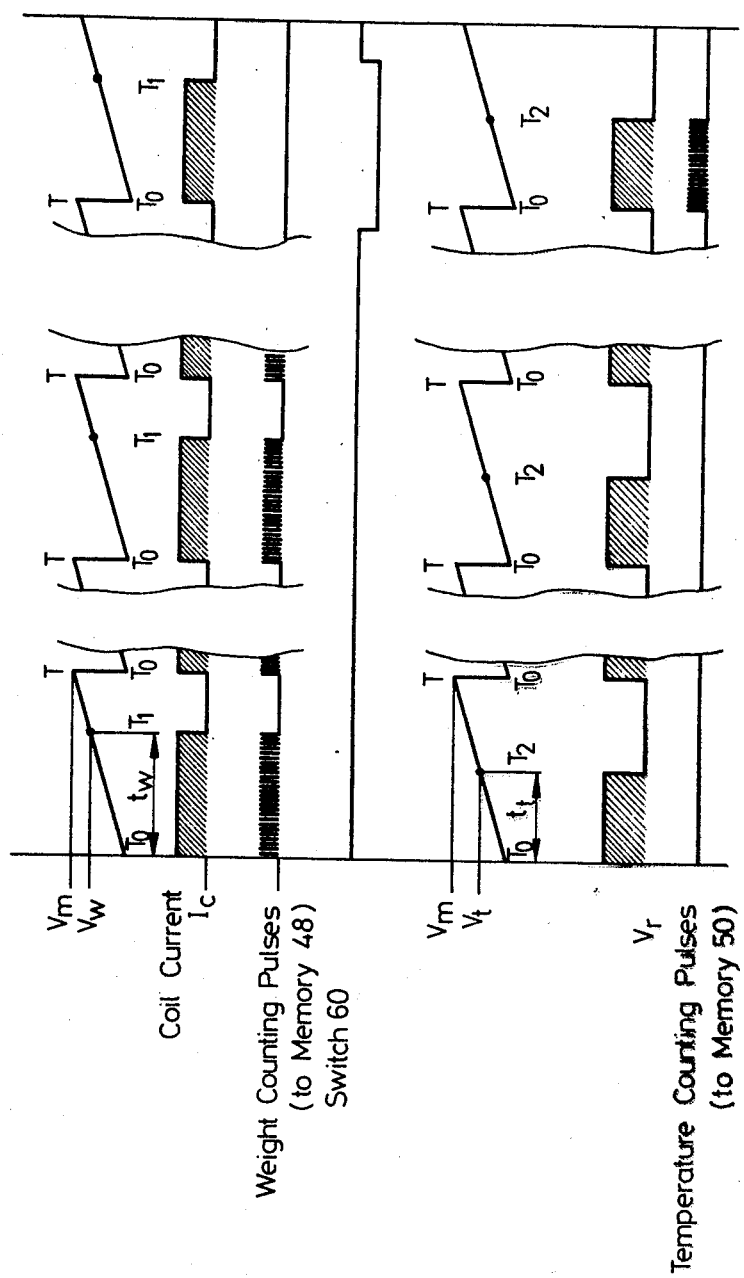
FIG. 2 is a waveform diagram illustrating the operation of the apparatus of FIG. 1.

Referring first more particularly to FIG. 1, the weighing apparatus 10 is of conventional return-to-zero electromagnetic load compensation type including a stationary member having means producing a stationary permanent magnetic field in which is arranged a movable load compensation coil 12 that is connected with the movable load receiving pan 14 (as shown in the Allenspach U.S. Pat. No. 3,786,884). Position detecting means 16 is operable to supply to control or signal shaping means 18 a displacement signal corresponding to the displacement of the movable member from its initial no-load position upon the application of the load to be measured to the weighing pan 14, thereby to provide a weight-responsive input signal $V_w$ to a first input terminal of first comparison means 20. A sawtooth waveform (FIG. 2) is supplied to the other comparator input terminal by a ramp generator 22 that is driven by timing pulses supplied by oscillator 30 via frequency divider 23, as is conventional in the art. As shown in FIG. 2, the comparator 20 serves as a pulse length modulator for operating switch 26 via synchronizing flip flop 24 for supply compensating current $I_c$ from constant current source 28 to compensation coil 12 for a period $t_w$ corresponding to the magnitude $V_w$ of the weight-responsive signal produced by position detector 16 and shaping means 18. The compensation current supplied to coil 12 reacts with the stationary permanent magnetic field to return the movable member toward its initial no-load position.

Flip flop 24 also sends a control signal to one input terminal of gate circuit 32 via electronic reversing switch 60, whereupon gate circuit 32 is operated to supply counting pulses from oscillator 30 to the counter unit 34 which is part of the counting and storage state of a microcomputer 38 having storage memories 48, 50 and 52. During the periods that compensating current $I_c$ is supplied to coil 12, counting pulses are supplied to storage memory 48, as shown in FIG. 2. According to a program for the individual scale apparatus contained in the ROM memory 40, the weight-responsive impulse sums are processed by the central computing unit (CPU) 42 into the resultant digital weight value which is supplied to indicator means 46 via decoding and driving circuit 44.

In order to correct for temperature variations in the apparatus, a temperature sensor 54 is mounted on one of the stationary scale members for supplying to the constant current source 28 via amplifier 56 a temperature correction signal $V_t$. This temperature correction signal varies the operating level of current produced by source 28 in such a manner that as the temperature rises, the constant current is roughly increased by a value corresponding to the amount the permanent magnetic field of the compensation system is weakened due to the average temperature coefficient of the magnetic means, whereby a rough compensation of the temperature influence upon the measurement result is obtained.

In accordance with the present invention, the temperature correction signal $V_t$ is supplied to one input terminal of a second comparator 58, which includes a second input terminal supplied with the sawtooth waveform produced by ramp generator 22. The amplified temperature-responsive signal $V_t$ is compared with the sawtooth signal to produce a resultant signal $V_r$ that is supplied via reversing switch 60 to the input terminal of gate 32 for periods of time $t_t$ corresponding with the magnitude of the temperature-responsive signal $V_t$. During these periods of time, gate 32 is operable to suppply temperature-responsive counting pulses to the counting and storing section 36 of the microcomputer 38. Thus, the reversing switch 60 is operable by a control signal supplied from the microcomputer 38 to alternately supply to gate 32 the output signals from weight comparator 20 or the temperature comparator 58, whereby weight-responsive and temperature-responsive pulse trains are alternately supplied to the microcomputer. These pulse train signals are stored in separate storage memories 48 and 50, respectively.

OPERATION

In operation, assume that the load to be measured is counted out during a period defined by 268 sawtooth ramps each having a duration of 2 msec. During a following sawtooth ramp at which no weight-responsive pulses are being counted, switch 60 is reversed by the signal from the microcomputer, whereupon the weight counting pulses are stored in storage memory 48, and the counter 34 is reset to zero. An interim weight value is now calculated, taking into account, if desired, correction factors of linearity and sensitivity obtained during the initial calibration of the instrument and stored in the ROM memory 40.

During the following ramp, the temperature-responsive signal of comparator 58 operates gate 32 to supply temperature-responsive counting pulses to counter 34. During the next empty ramp period, switch 60 is reversed to its initial position, and the temperature-responsive pulse count in counter 34 is transferred to storage memory 50, the counter then being reset to zero. During an next empty ramp when no counting pulses are measured, a conventional functional error safety check may be performed, whereupon the entire cycle is repeated, commencing with the counting of 268 weight ramps.

The stored digital temperature value is computed according to a fixed predetermined correction formula with the interim weight, whereupon the resultant corrected weight is displayed on the display means 46. The formulas for providing the temperature correction factors are known in the art, and by the apparatus described above, it is possible in a simple manner to achieve substantially complete compensation of the adverse temperature influences. Thus, the combination of temperature-responsive digital correction within the system together with the analog correction of the constant current source 28 is advantageous. It is apparent, however, that the digital correction could be accomplished alone.

In each case, a considerable simplification in the manufacture of the scale and in its operation results from the fact that there is no adjustment whatsoever for example by means of potentiometers. Besides, the latter viewpoint is important particularly for scales that are subject to mandatory calibration. A conventional formula which can be used to calculate the temperature-compensated weight result from the weight pulses and from the temperature pulses is:

$$W = MW + MW \cdot a \cdot \Delta T + MW \cdot b \cdot (\Delta T)^2,$$

wherein
  MW is the weight calculated from the weight pulses ("measured weight")
  $\Delta T$ is the temperature difference in degrees
  a and b are factors taking into account the conversion rate pulses/degrees, calibrating factors and so on.

The foregoing example was described in connection with a microcomputer which performs the necessary calculations and most of the control functions according to its program. But it must be emphasized that the use of a microcomputer does facilitate a particularly suitable implementation of the invention although it is not compulsory; the invention can readily be implemented also by means of correspondingly assembled separate circuits. Other modifications may be made in the apparatus described without deviating from the inventive concepts set forth above.

What is claimed is:

1. In a weighing apparatus of the electromagnetic load compensation type including
   (a) a stationary member (10) having means defining a stationary permanent magnetic field;
   (b) a movable load carrier (14) normally having an initial no-load position relative to said stationary member;
   (c) compensation coil means (12) connected with said load carrier for movement in said magnetic field;
   (d) means (16, 18) for generating an analog weight-responsive signal ($V_w$) as a function of the displacement of the movable load carrier from its initial no-load position relative to said stationary member;
   (e) first comparison means (20) for comparing said weight-responsive signal with a sawtooth waveform signal to produce a compensation output signal ($V_c$) including a plurality of pulses the lengths of which are a function of the magnitude of said weight-responsive signal;
   (f) means (26, 28) operable by said output signal for supplying compensation current to said coil means for periods of time corresponding with the lengths of said output signal pulses; and
   (g) load indication means for indicating the magnitude of the load applied to the load carrier, including a source of counting pulses (30), a counter (34), and means (24, 60, 32) for supplying a first train of said counting pulses to said counter for periods of times corresponding with the lengths of said compensation output signal pulses;

the improvement which comprises:
   (h) means (48) for storing the weight-responsive count of said counter means;
   (i) temperature compensation means for supplying temperature-responsive pulses to a counter means as a function of variations in the temperature of the weighing system, said temperature compensation means including
      (1) means including a temperature sensor (54) mounted on said stationary member for producing a temperature-responsive analog signal ($V_t$); and
      (2) means for supplying a second train of counting pulses the number of which corresponds with the magnitude of said temperature-responsive analog signal; and
   (j) means (42) for processing the weight pulse count with the temperature-responsive pulse count to produce a temperature-compensated weight result.

2. Apparatus as defined in claim 1, wherein said temperature-responsive pulse train is supplied intermediate a number of said weight-responsive pulse trains.

3. Apparatus as defined in claim 1, wherein said means for supplying said second train of counting pulses includes second comparison means (58) operable to compare said temperature-responsive analog signal with said ramp signal, thereby to produce a resultant signal ($V_r$) that comprises a series of pulses each having a length which is a function of the magnitude of said temperature-responsive signal.

4. Apparatus as defined in claim 1, and further including means for adjusting the operating level of said constant current source as a function of the magnitude of said temperature-responsive analog signal.

5. Apparatus as defined in claim 1, wherein said counting means (34) is operable to count the pulses of said weight-responsive and temperature-responsive pulse trains, respectively, and further including a plurality of storage means (48, 50, 52) for storing the counts of said weight-responsive and temperature-responsive pulse trains, respectively.

* * * * *